(12) United States Patent
Marsyla et al.

(10) Patent No.: US 7,545,386 B2
(45) Date of Patent: Jun. 9, 2009

(54) UNIFIED MOBILE DISPLAY EMULATOR

(75) Inventors: David John Marsyla, Belmont, CA (US); Faraz Ali Syed, Dublin, CA (US)

(73) Assignee: Mobile Complete, Inc., San Mateo, CA (US)

( * ) Notice: Subject to any disclaimer, the term of this patent is extended or adjusted under 35 U.S.C. 154(b) by 393 days.

(21) Appl. No.: 11/636,265

(22) Filed: Dec. 7, 2006

(65) Prior Publication Data

US 2008/0140380 A1 Jun. 12, 2008

(51) Int. Cl.
G09G 5/00 (2006.01)
G09G 5/02 (2006.01)
G09G 5/36 (2006.01)
G03F 3/08 (2006.01)
H04N 5/46 (2006.01)
G06K 9/34 (2006.01)
G06T 15/16 (2006.01)
G06T 1/00 (2006.01)
G06F 9/445 (2006.01)
G06F 17/00 (2006.01)
G06K 9/32 (2006.01)
H04N 7/01 (2006.01)
H04N 11/00 (2006.01)

(52) U.S. Cl. .................. 345/600; 345/589; 345/604; 345/522; 345/545; 348/441; 348/467; 348/558; 348/557; 358/1.15; 358/518; 358/523; 382/162; 382/167; 382/293; 703/26

(58) Field of Classification Search .............. 345/422, 345/581, 589–591, 600–604, 522, 549, 690, 345/204, 545–546; 348/441, 467, 557–558; 358/512, 515, 518, 523, 1.15–1.17; 709/201, 709/217, 218–219; 703/13, 23, 26; 382/162, 382/167, 293, 295
See application file for complete search history.

(56) References Cited

U.S. PATENT DOCUMENTS

| | | | | |
|---|---|---|---|---|
| 5,727,159 | A * | 3/1998 | Kikinis ................. | 709/246 |
| 5,809,415 | A * | 9/1998 | Rossmann ............. | 455/422.1 |
| 2001/0006016 | A1 * | 7/2001 | Henderson et al. ..... | 83/13 |
| 2004/0017583 | A1 * | 1/2004 | Kageyama et al. ..... | 358/1.15 |
| 2004/0172484 | A1 * | 9/2004 | Hafsteinsson et al. .. | 709/246 |
| 2007/0053429 | A1 * | 3/2007 | Jawerth et al. ........ | 375/240 |
| 2008/0062167 | A1 * | 3/2008 | Boggs et al. .......... | 345/419 |

* cited by examiner

*Primary Examiner*—Wesner Sajous
(74) *Attorney, Agent, or Firm*—Morrison & Foerster LLP

(57) ABSTRACT

The conversion of Mobile Display information used in a wide variety of Mobile Devices into Unified Image Formats is disclosed to enable viewing on a desktop computer system in addition to manual and automated testing of Mobile Content. In order to support the variety of Mobile Displays available, and to process the Mobile Display information in real-time, a configurable emulation system may be employed to model the Image Commands being used for each type of available Mobile Display. This emulation system can then provide a representative view of the image as it would be displayed on the Mobile Display, but in a format that can be utilized by other manual or automated systems.

12 Claims, 11 Drawing Sheets

UNIFIED MOBILE DISPLAY EMULATOR

FIELD OF THE INVENTION

Embodiments of the present invention relate to the testing of Mobile Content, and more particularly, to the emulation of Mobile Displays using a common image data format.

BACKGROUND OF THE INVENTION

A large variety of mobile information processing devices ("Mobile Devices") are produced each year. Most Mobile Devices currently available contain an operating system ("Mobile Operating System") to process information and run mobile applications. Most Mobile Devices currently available also utilize visual displays ("Mobile Display") to show information about the current status of the device, and to allow the device user to interact with software applications running on the device. These Mobile Displays can be manufactured from any number of technologies but are generally some form of flat LCD panel. The growing capabilities of Mobile Devices have led to a rapid expansion in the number of software applications, such as mobile games and mobile internet content, being developed for these devices. It has also led to a proliferation of downloadable background images or "wallpaper", and musical songs played during an incoming call or "ringtones". Together these applications and downloadable files are referred to as mobile content ("Mobile Content").

Due to the variety of Mobile Operating Systems available, and the variety of Mobile Displays that are used by the devices, it is necessary for Mobile Content developers to test their applications for compatibility on a large number of Mobile Devices, often several hundred unique models.

Previously, the majority of this testing was performed by purchasing a copy of each target Mobile Device and manually testing the Mobile Content on each device. This manual Mobile Operating System and Mobile Display compatibility testing has become one of the most expensive and time consuming activities related to Mobile Content development, often representing 20-30% of the cost of Mobile Content. Hence there is a need for reliable test systems which can be used to simplify or automate the testing process for this Mobile Content.

There are two basic approaches to simplifying the complexity of Mobile Content testing, and providing a unified test system for Mobile Content development.

The first approach is to attempt to emulate each type of Mobile Operating System available. Although some systems do exist that emulate specific functionality of Mobile Operating Systems (such as their internet browsers), even these limited systems have been found to be unrepresentative of the actual behavior when Mobile Content is loaded onto a physical Mobile Device. Unfortunately, attempts to expand the scope, or improve the accuracy of these limited Mobile Operating Systems emulations, have proven impractical due to the complexity of the Mobile Operating Systems and the rapid pace at which new Mobile Devices are being developed. Systems utilizing this approach have therefore not been widely adopted due to these limitations.

The second approach is to emulate each type of Mobile Display available, while still loading the Mobile Content onto a physical Mobile Device. This approach allows the Mobile Content to be viewed and managed using a standardized interface, such as a desktop computer application, while still providing a completely representative view of the behavior of the application on the target Mobile Operating System.

Previously, it was not possible to emulate the wide variety of Mobile Displays because there was no system that could adapt to the different types of Mobile Displays available. For example, a survey of 493 Mobile Devices determined that there were 210 unique Mobile Display configurations, and 1,154 unique image processing commands ("Image Commands") used to display information on the Mobile Displays. Image processing commands are the low level instructions used to render display information on a Mobile Display.

Therefore, there is a need for adaptive Mobile Display emulation which can convert the variety of Mobile Displays into common image data formats ("Unified Image Formats") such as 24 Bit RGB, GIF, JPEG, or MPEG, or any other format suitable for viewing on a desktop computer system. Once the information is available in a Unified Image Format, many other applications can be designed to simplify manual or automated testing of Mobile Content ("Manual Or Automated Test Interfaces").

SUMMARY OF THE INVENTION

The present invention provides a means for converting the Mobile Display information used in the wide variety of Mobile Devices into Unified Image Formats suitable for viewing on a desktop computer system. Unified Image Formats enable manual and automated testing of Mobile Content.

In order to support the variety of Mobile Displays available, and to process the Mobile Display information in real-time, it is necessary to have a configurable emulation system which can be used to model the Image Commands being used for each type of available Mobile Display. This emulation system can then provide a representative view of the image as it would be displayed on the Mobile Display, but in a format that can be utilized by other manual or automated systems.

The raw data that is fed into the Unified Mobile Display Emulator may be generated by intercepting the data communication stream between a Mobile Operating System and a Mobile Display of a Mobile Device. The raw data may include numerical codes and data representing Image Commands as well as data representing visual color information ("Image Data"). Together these Image Commands and Image Data can be communicated to the Mobile Display as a stream of digital information ("Communication Data"). Along with the Communication Data are several digital signals ("Control Signals") which may be used to distinguish Image Commands from Image Data, and from information not intended for the Mobile Display.

The Control Signals may take a variety of forms, including binary digital signals which are transferred in parallel with the Communication Data, and provide additional information about the type of data in the communication stream.

Intercepting the Communication Data may be performed through a hardware integration approach to electrically intercept the digital signals as they are being transferred to the Mobile Display. As part of this electrical integration, the physical Mobile Display may be removed from the device, or the integration may be done in a passive manner which merely copies the Communication Data without any interference.

Although some embodiments of this invention use a hardware based extraction of the Communication Data, in other embodiments a software agent based approach may also be used to extract the raw information that is fed into the Unified Mobile Display Emulator. In this instance, the software agent may be a software program running on the Mobile Operating System itself and communicating with the Emulator through any standard communication channel found on a Mobile Device. This communication channel may include over-the-air communication, USB, Serial, Bluetooth, or any number of other communication protocols used for exchanging information with an application running on a Mobile Operating System.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

Embodiments of the present invention are directed to converting Mobile Display information used in a wide variety of Mobile Devices into Unified Image Formats to enable viewing on a desktop computer system in addition to manual and automated testing of Mobile Content. In order to support the variety of Mobile Displays available, and to process the Mobile Display information in real-time, a configurable emulation system may be employed to model the Image Commands being used for each type of available Mobile Display. This emulation system can then provide a representative view of the image as it would be displayed on the Mobile Display, but in a format that can be utilized by other manual or automated systems.

Figure 1:
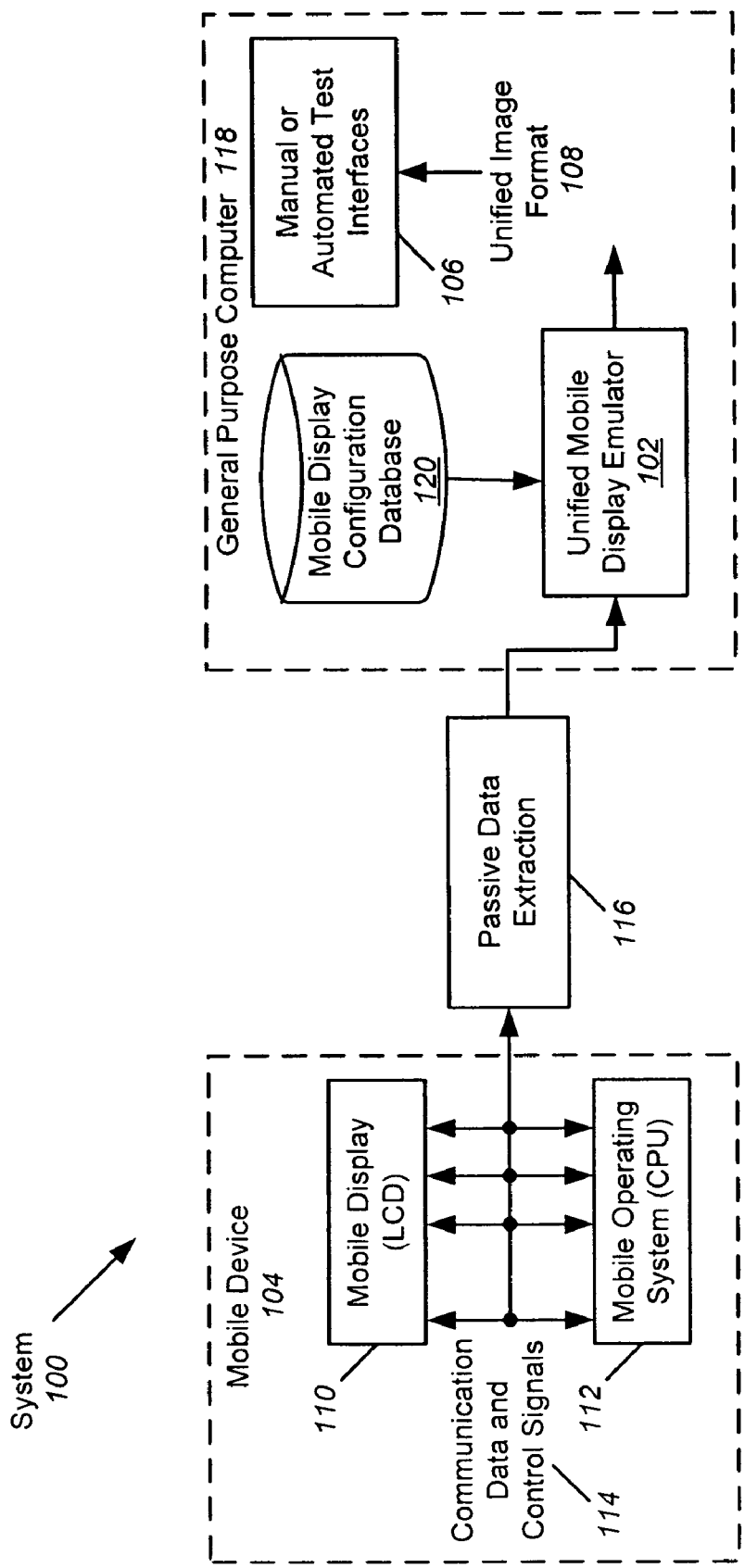
FIG. 1 is a block diagram of an exemplary system environment according to some embodiments of this invention.

FIG. 1 is a block diagram of an exemplary system environment 100 according to some embodiments of this invention. The Unified Mobile Display Emulator 102 can provide a bridge between raw digital information that is extracted from a Mobile Device 104, and Manual or Automated Test Interfaces 106 that rely on standard or Unified Image Formats 108. One function of the Emulator 102 is to process a stream of video information coming from a Mobile Device 104 and convert it to a standard image or video format 108.

The most common usage of the Emulator 102 is to provide immediate image conversion to a Unified Image Format 108, but the system 100 could also be used to perform the same conversion in a delayed manner to make the image data available at a later time.

Mobile Device 104 may be a portable information processing device such as a cell phone or PDA which is commonly used to execute or view Mobile Content applications and information. It should be understood, however, that other devices such as digital audio players (e.g. MP3 players) and digital cameras have similar displays and can be used in conjunction with embodiments of this invention.

Mobile Display 110 can be the display of a Mobile Device 104 which is used to display information about the status of the Mobile Device and to allow interaction with Mobile Content or other information services available on the device. Mobile Display 110 may include, but is not limited to, a small flat panel LCD display, plasma or OLED technologies.

Mobile Operating System 112 can be the processing system that is used to control the functionality of the Mobile Device 104. An operating system is comprised of a central processing unit (CPU), volatile and non-volatile computer memory, input and output signal wires, and a set of executable instructions which control the function of the system.

Mobile Operating System 112 may include open development platforms such as BREW, Symbian, Windows Mobile, Palm OS, Linux, along with various proprietary platforms developed by Mobile Device manufacturers.

Communication Data and Control Signals 114 can include the information that is being transferred from the Mobile Operating System 112 to the Mobile Display 110 to form graphical images, or displaying other information on the Mobile Display. As the information passes from the Mobile Operating System 112 to the Mobile Display 110, translations of the display information may occur due to various intermediate hardware graphics processors. The translations may be simple, such as converting a parallel data stream (where data is transferred across many wires at once) into a serial data stream (where data is transferred on a smaller number of wires). Alternatively or in addition, more complex translations may be performed by a Graphics Processing Unit (GPU) such as converting higher level drawing or modeling commands into a final bitmap visual format. It should be understood that although the information may take different forms at various processing stages, the information is meant to accomplish the task of displaying graphical or other information on the Mobile Display 110.

Passive Data Extraction 116 intercepts and copies the Communication Data and Control Signals 114 and makes this raw information available to the Unified Mobile Display Emulator 102. The interception may enable passive copying of the information as it is being transferred to the Mobile Display 110, but a disruptive approach may also be used to extract the information. Although a disruptive approach to extract the communication data may interfere with the operation of the Mobile Display 110, this may be immaterial in cases where only the Unified Mobile Display Emulator 102 is needed to interact with the device.

Passive Data Extraction 116 may be configured as some form of hardware sensor that can detect the signal levels of the Communication Data and Control Signals 114 and make a digital copy of that information as it is being transferred to the Mobile Display 110. Generally available products such as logic analyzers can perform this task, as well as custom hardware designed specifically to extract this digital information from Mobile Devices 104.

Although some embodiments of this invention use a hardware based extraction of the Communication Data 114, in other embodiments a similar software agent based approach may also be used to extract the raw information that is fed into the Unified Mobile Display Emulator 102. In this instance, the software agent can be a software program running on the Mobile Operating System 112 itself and communicating with the Emulator 102 through any standard communication channel found on a mobile device. This communication channel may include over-the-air communication, USB, Serial, Bluetooth, or any number of other communication protocols used for exchanging information with an application running on the Mobile Operating System 112.

The General Purpose Computer 118 may include any computer system that is able to run software applications or other electronic instructions. This may include, but is not limited to, generally available computer hardware and operating systems such as a Windows PC or Apple Macintosh, or server based systems such as a Unix or Linux server. This could also include custom hardware designed to process instructions using either a general purpose CPU, or custom designed programmable logic processors based on CPLD, FPGA or any other similar type of programmable logic technologies.

The Mobile Display Database 120 can be a repository of information which is gathered about a particular Mobile Display 110. This configuration information may relate to the features and functionality of a particular Mobile Display 110, and the data formats being used in the Communication Data and Control Signals 114.

In some embodiments, this information can be gathered ahead of time from documented features of the device, or from reverse engineering the device data formats, and then storing the information in a data repository. Much of the information could also be determined from the live data stream of the device.

In some embodiments, the configuration information can be stored by using a readily available database system designed to store and retrieve information. The information could also be stored in a simple computer disk file, or stored into non-volatile memory. The format of the information could take almost any form, including but not limited to database records, structured data files such as XML, or a simple data structure that can be represented in memory or a disk file.

The Manual or Automated Test Interfaces 106 can be computer applications or other systems which can be used to simplify the testing of Mobile Content and Mobile Devices 104. These systems can take a number of forms, and each may rely on a Unified Image Format to enable interactive viewing, or automated processing of image data being produced by a Mobile Device 104.

In some embodiments of this invention, these test interfaces may be computer applications that allow manual interactions with a Mobile Device 104. These manual interactions can allow a person to interact with a Mobile Device 104 by virtually pressing keys on the device through a standard computer interface such as a mouse or keyboard, and viewing the results of their actions on their computer display. The computer display can present an accurate representation of what would appear on the Mobile Display 110 as it happens, or a delayed view that appears at some later point in time.

In other embodiments, these test interfaces may be automated computer applications that interact with a Mobile Device 104 without the need for a person to observe or interact with the application. These automated systems may run through recorded or programmed test sequences on the Mobile Device 104, and can use the information that would appear on the Mobile Display 110 to perform comparisons with saved visual or textual information.

The Unified Image Format 108 can be a simple visual image format that can be used by manual or automated test systems. This image format can be produced from a stream of visual information coming from a Mobile Device 104 and can serve to unify the wide variety of visual, instruction, and transport formats used by Mobile Displays 110.

In some embodiments of this invention, the Unified Image Format 108 is a simple 24 bit uncompressed RGB format, but any standard image or video format such as JPEG, GIF, or MPEG, could also be used. Custom designed proprietary formats could also be used for the Unified Image Format 108. The Manual or Automated Test Interfaces 106 are enabled because the display information of multiple Mobile Devices can be converted to a single format.

The information being processed by the Unified Mobile Display Emulator 102 components can include of a stream of information that is passively extracted from the Mobile Device 104, and dynamically converted into a standard visual image format that is suitable for display in a manual test environment or for processing by an automated test system.

The interactions between various components of the Unified Mobile Display Emulator 102 are mostly defined by the format of the data that is passed between the components. The various data interchange formats are described below along with each processing component contained within the system.

Unified Mobile Display Emulator

Figure 2:
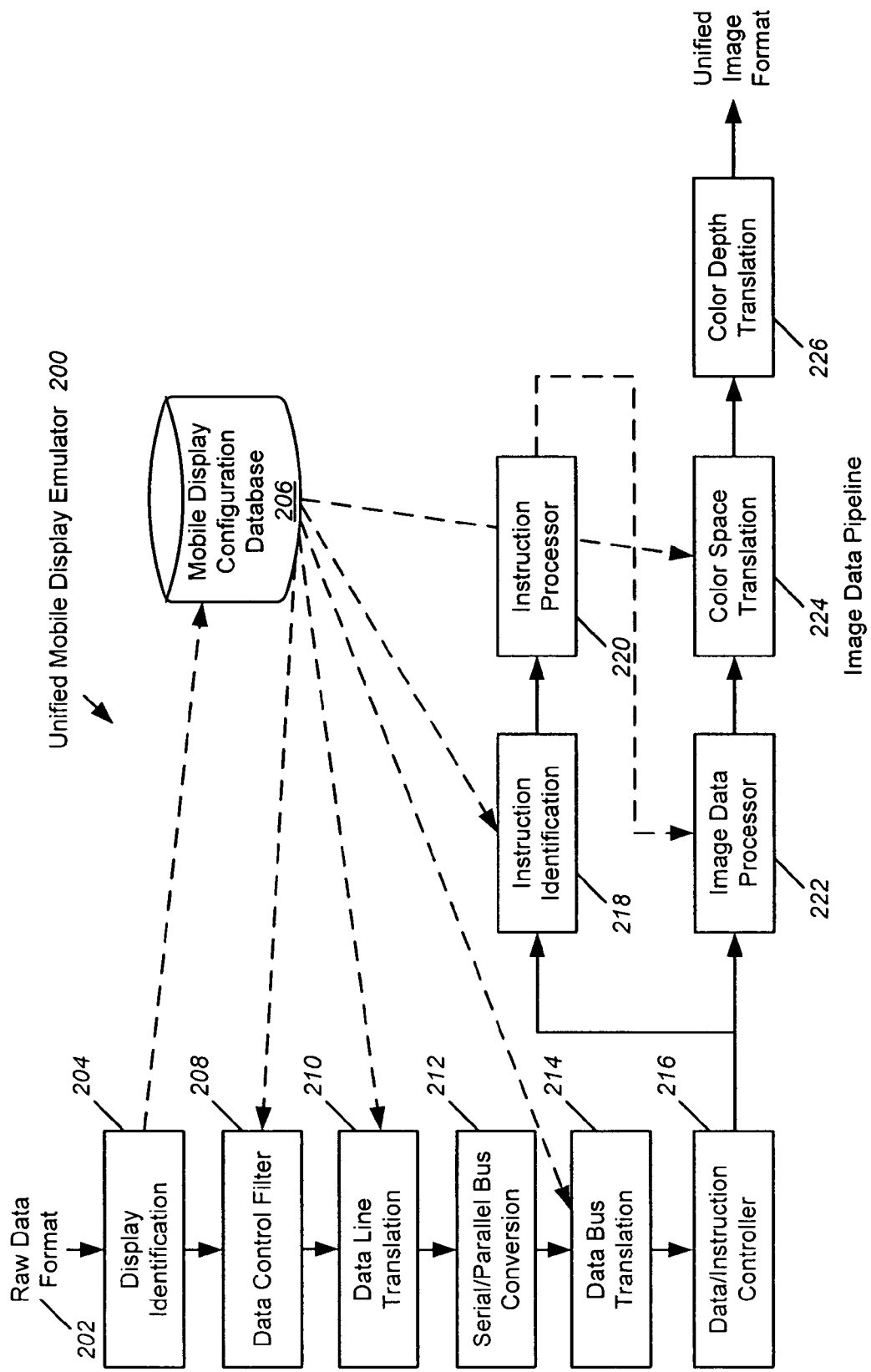
FIG. 2 is a block diagram of an exemplary Unified Mobile Display Emulator according to some embodiments of this invention.

FIG. 2 is a block diagram of an exemplary Unified Mobile Display Emulator 200 according to some embodiments of this invention. The information initially presented to the Emulator 200 may be referred to herein as the Raw Data Format 202. This can be a combination of the Communication Data and Control Signals extracted by the Passive Data Extraction.

There is no single format for this information as it is highly dependent on the type of Mobile Display that is being processed by the Emulator 200. In some embodiments, this information can be a digital copy of the information that is being communicated to the Mobile Display.

The first step in processing the Raw Data Format 202 correctly is to identify the type of Mobile Display being processed (see block 204). In general, this identification may be performed ahead of time and the configuration stored in the Mobile Display Configuration Database 206. The identification could also be done as part of the Emulator processing.

The Data Control Filter 208 can filter out information from the Raw Data Format 202 that is not important for displaying the Mobile Display image. This step may be needed because it is possible for the Communication Data and Control Signals to be used to control multiple sub-systems on a Mobile Device. For example, the same Communication Data lines may be used to control the Mobile Display, and a digital camera for the Mobile Device.

In cases where only some of the Communication Data is intended for the Mobile Display, one of the Control Signals can be used to indicate that the Mobile Display should process the information. This Control Signal may be referred to as a Chip Select (CS) data line, and can be used to enable one hardware component at a time for a shared data bus. There may be multiple CS lines for different hardware components in the Mobile Device, but only one of them will select the Mobile Display.

Along with the Chip Select line, there may be an additional line that indicates when data is being written to the display, or information is being read back from the display. This may be referred to as a Read Write (RW) data line. Since the Unified Mobile Display Emulator is only concerned with data that is being written to the Mobile Display to be rendered as an image, any other information that is being read back from the Mobile Display can also be filtered out at this stage.

Data Control Filter

Figure 3:
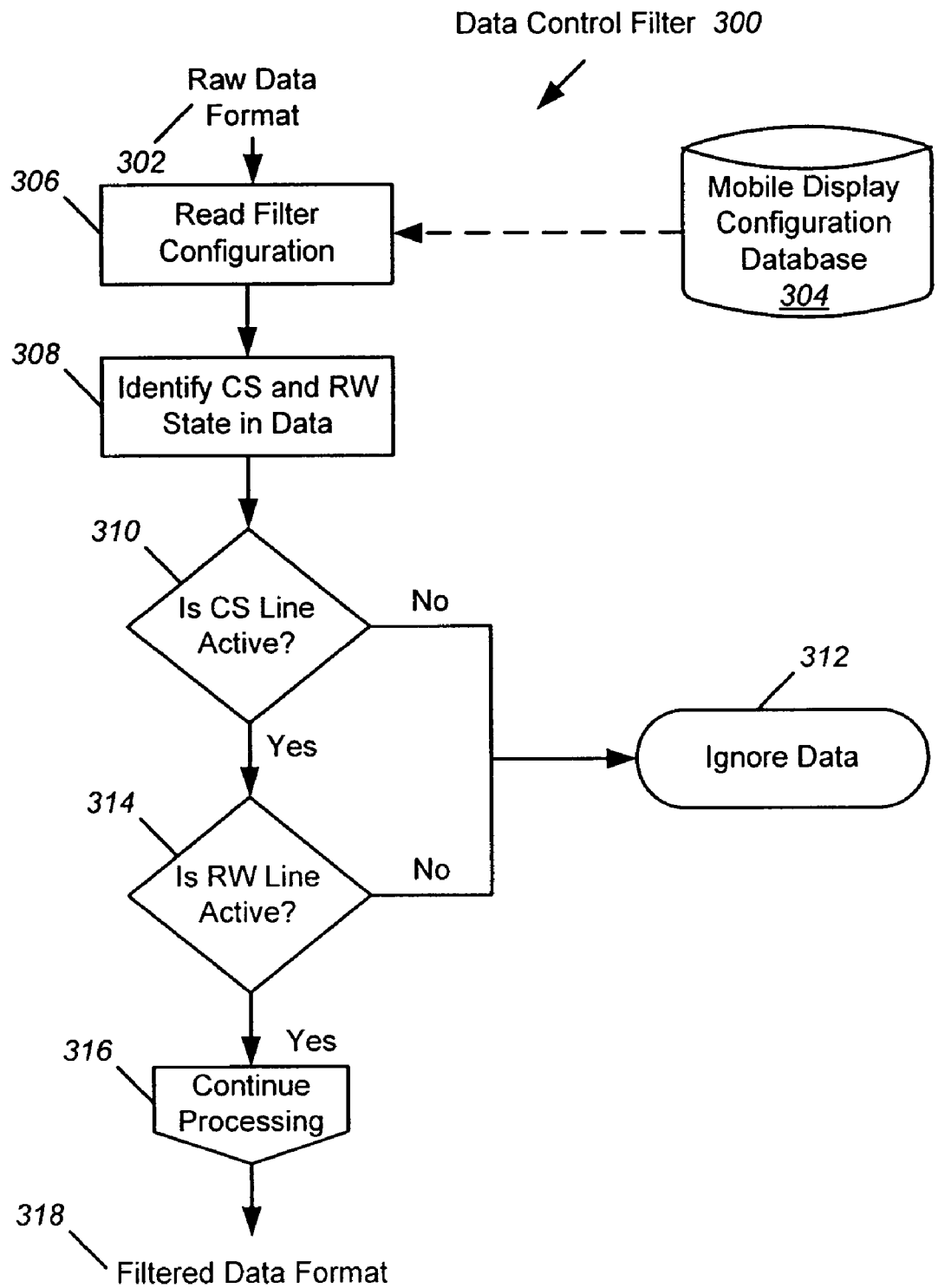
FIG. 3 is a flow diagram of an exemplary Data Control Filter according to some embodiments of this invention.

FIG. 3 is a flow diagram of an exemplary Data Control Filter 300 according to some embodiments of this invention. As mentioned above, the information initially presented to the Emulator may be referred to herein as the Raw Data Format 302. This can be a combination of the Communication Data and Control Signals extracted by the Passive Data Extraction.

The Mobile Display Configuration Database 304 can contain information about which data line, if any, is used to select the Communication Data for the Mobile Display. The information may be retrieved directly from the Configuration Database 304 each time data is processed, or may be stored as part of the local process to improve performance of the system (see block 306).

The CS and RW lines are binary electrical signals that can be represented by the value 0 or 1. Depending on the type of Mobile Display, a CS value of 0 may select the display hardware, or a CS value of 1 may select the display hardware. The same may be true for the RW line. On some Mobile Displays, a value of 0 indicates Write, on others, a value of 1 indicates Write. The Mobile Display Configuration Database 304 can store the information for the specific Mobile Display that identifies the mapping of this data line (see block 308).

Next, the Data Control Filter 300 may look at the current state of the Control Signals, and determine if each of the signals is defined as Active or Inactive, based on our current configuration. In step 310, the Data Control Filter 300 can make a decision based on the Active state of the CS line. In the example of FIG. 3, the CS line is Active when the Mobile Display has been selected to receive visual information. If the CS line is Active, the Data Control Filter 300 can continue processing the information. If the CS line is Inactive, the Data Control Filter 300 can ignore the data (see block 312) since it is not intended for the Mobile Display. This ignored data, which has been filtered out of the incoming data stream, will thereafter be ignored for image processing.

In step 314, the Data Control Filter 300 can make a decision based on the Active state of the RW line. In the example of FIG. 3, the RW line is Active when information is being written to the Mobile Display. If the RW line is Active, the Data Control Filter 300 can continue processing the information (see block 316). If the RW line is Inactive, the Data Control Filter 300 can ignore the data (see block 312) since it is not intended for the Mobile Display. The Filtered Data Format 318 is similar to the Raw Data Format, except that information not intended for the Mobile Display has been eliminated.

Referring again to FIG. 2, the Data Line Translation 210 is responsible for re-ordering the Communication Data in the Filtered Data Format so that it matches standard integer value formats used by general purpose computers. This translation does not impact the Control Signals that are also contained in the data stream.

This step may be necessary since the original Communication Data extracted by the Passive Data Extraction may be in a non-standard format. Often, the physical wires that are routed between the Mobile Operating System and the Mobile Display are ordered in a way that makes it easier to build the Mobile Device hardware, but not in a typical binary position that could be interpreted by a general purpose computer.

Data Line Translation

Figure 4:
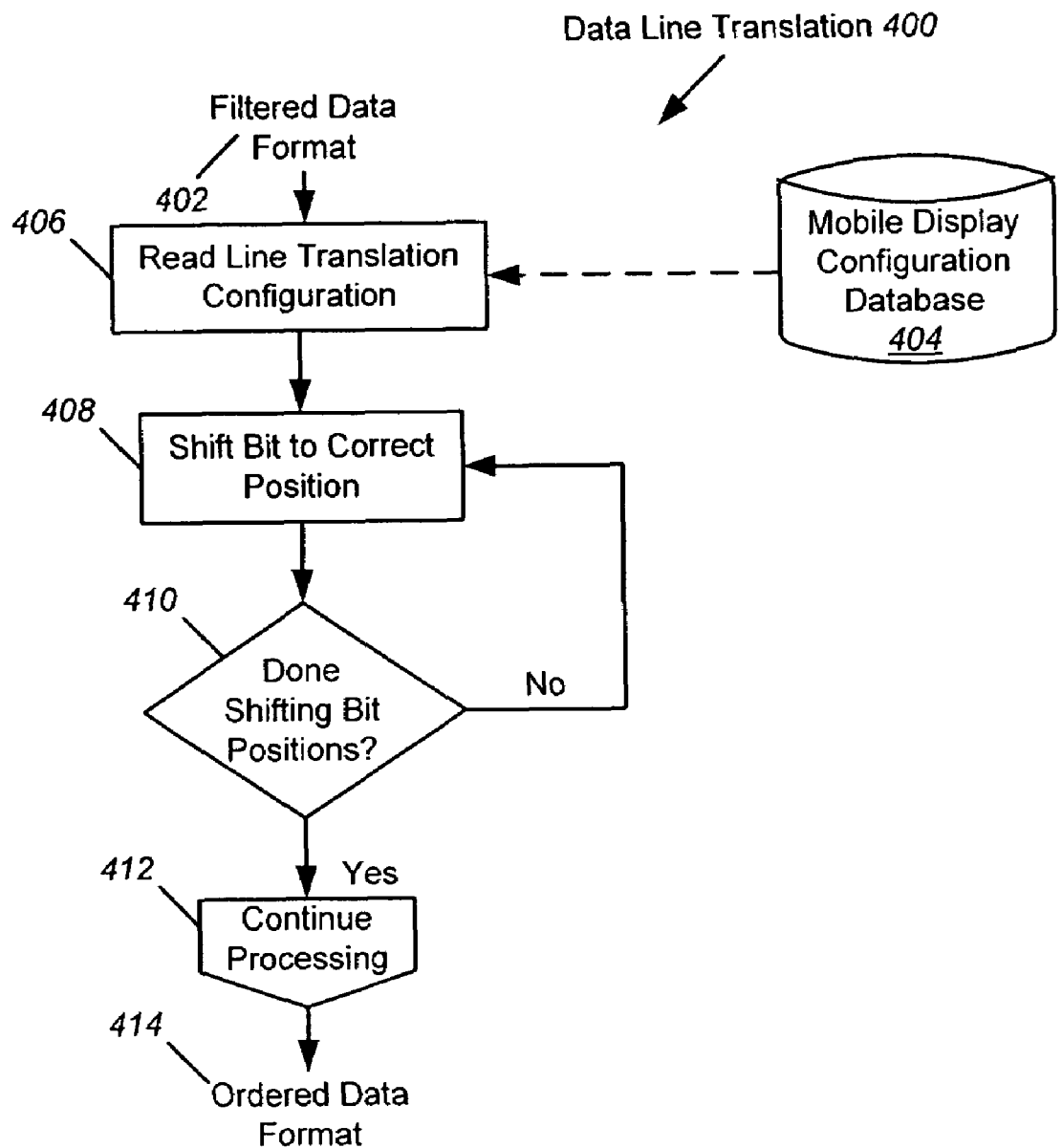
FIG. 4 is a flow diagram of an exemplary Data Line Translation according to some embodiments of this invention.

FIG. 4 is a flow diagram of an exemplary Data Line Translation 400 according to some embodiments of this invention. As mentioned above, the Filtered Data Format 402 is similar to the Raw Data Format, except that information not intended for the Mobile Display has been eliminated.

The Mobile Display Configuration Database 404 can contain information about the current order of the Communication Data, and the changes necessary to convert this to a more standard integer data format. The information may be retrieved directly from the Configuration Database 404 each time data is processed, or may be stored as part of the local process to improve performance of the system (see block 406).

Step 408 is responsible for re-ordering one bit of information in the current Filtered Data Format to the standard position of this information that is represented by an integer value on a general purpose computer. This step may be executed multiple times if there are many changes that need to be made to the incoming data stream.

In step 410, a determination is made as to whether the re-ordering of the incoming data stream has been completed. If the process is complete (see block 412) processing continues. If the process is not yet complete, the process continues looping and shifting more bits of information into the correct position.

The Ordered Data Format 414 contains the same data that was in the Filtered Data Format 402, but the data is now stored in a format that can be processed more easily by a general purpose computer. This means that the Communication Data values that are being processed are now in a standard integer format that can be used to process the information as numerical values, or as visual image data.

Referring again to FIG. 2, the Serial/Parallel Bus Conversion step 212 is necessary for some types of Mobile Displays. This conversion process can convert several samples of Communication Data into a single sample by "flattening" out the information. For example, a serial data stream may send one bit of binary information during each data sample. A group of these bits of binary information (generally 8 or 16 samples) can be converted into a single byte or word of information by shifting the information one bit at a time into a single integer value.

Serial/Parallel Bus Conversion

Figure 5:
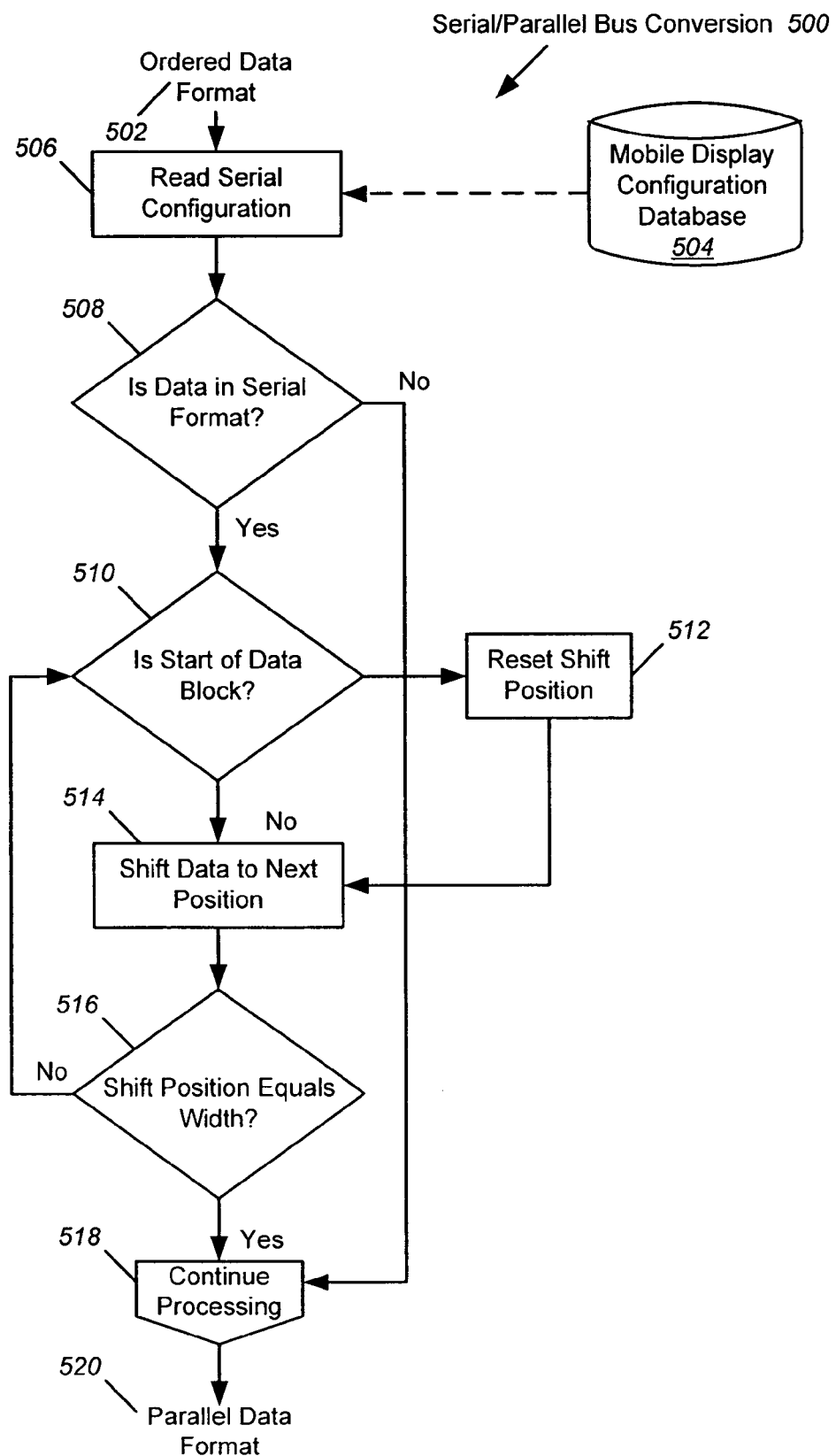
FIG. 5 is a flow diagram of Serial/Parallel Bus Conversion according to some embodiments of this invention.

FIG. 5 is a flow diagram of Serial/Parallel Bus Conversion 500 according to some embodiments of this invention. As mentioned above, the Ordered Data Format 502 contains the same data that was in the Filtered Data Format, but the data is now stored in a format that can be processed by a general purpose computer. This means that the Communication Data values that are being processed are now in a standard integer format that can be used to process the information as numerical values, or as visual image data. If the Ordered Data Format is a serial data stream, a single bit of information will be extracted from multiple samples of the ordered data to produce a single sample of parallel data.

The Mobile Display Configuration Database 504 can contain information about the requirement for the Mobile Display information to be converted from Serial to Parallel format. The information may be retrieved directly from the Configuration Database 504 each time data is processed, or may be stored as part of the local process to improve performance of the system (see block 506).

In step 508, a determination is made as to whether the data is in Serial format, or is already in Parallel format and does not need to be converted. If the data is in Serial format, the data will be converted to parallel format. If the data is already in Parallel format, this processing step will be skipped.

In step 510, a determination is made as to whether the incoming data is the start of a data block or not. The start of a data block is defined as the first sample of information in a data stream. For the first sample of information, it is necessary to reset the shift position of the data so that a consistent conversion from serial to parallel data is performed. Without this alignment, mis-aligned data that does not generate proper integer values could result.

Step 512 resets the shift position of the data back to zero. The shift position is used to count the number of samples containing serial data bits that have been read from the Ordered Data Format so that it can be determined whether a single parallel sample is present.

Step 514 takes the next incoming sample of ordered data, extracts a single bit of information (the lowest order bit in the incoming stream) and shifts it into the next position of the parallel data sample being generated.

In step 516, a determination is made as to whether enough information has been shifted into the sample to create a single parallel sample of data. The shift width indicates the number of bits that are to be read from our serial data stream to form one parallel sample. This is typically 8 or 16 bits of data, but may be another number such as 9 or 18 or 24 bits.

If it is determined that the incoming data was already in parallel format, or we have converted the data from serial to parallel format, processing the incoming data stream can continue (see block 518). The Parallel Data Format 520 may contain a single integer of data in each sample of the data stream. This is the same as the Ordered Data Format for Mobile Displays that did not need a serial to parallel conversion.

Referring again to FIG. 2, the Data Bus Translation step 214 may be necessary to handle Mobile Displays that transfer a single large integer of data over two or more parallel data bus samples. The typical configuration for this is to transfer a 16 bit integer using two 8 bit samples. Other common configurations are to transfer a 24 bit integer using three 8 bit samples, or a 32 bit integer using two 16 bit samples. This translation is not always necessary, and if a single bus read of 16 or 24 or 32 bits maps to a single data sample, a direct copy of the data will be made without the translation being applied.

Data Bus Translation

Figure 6:
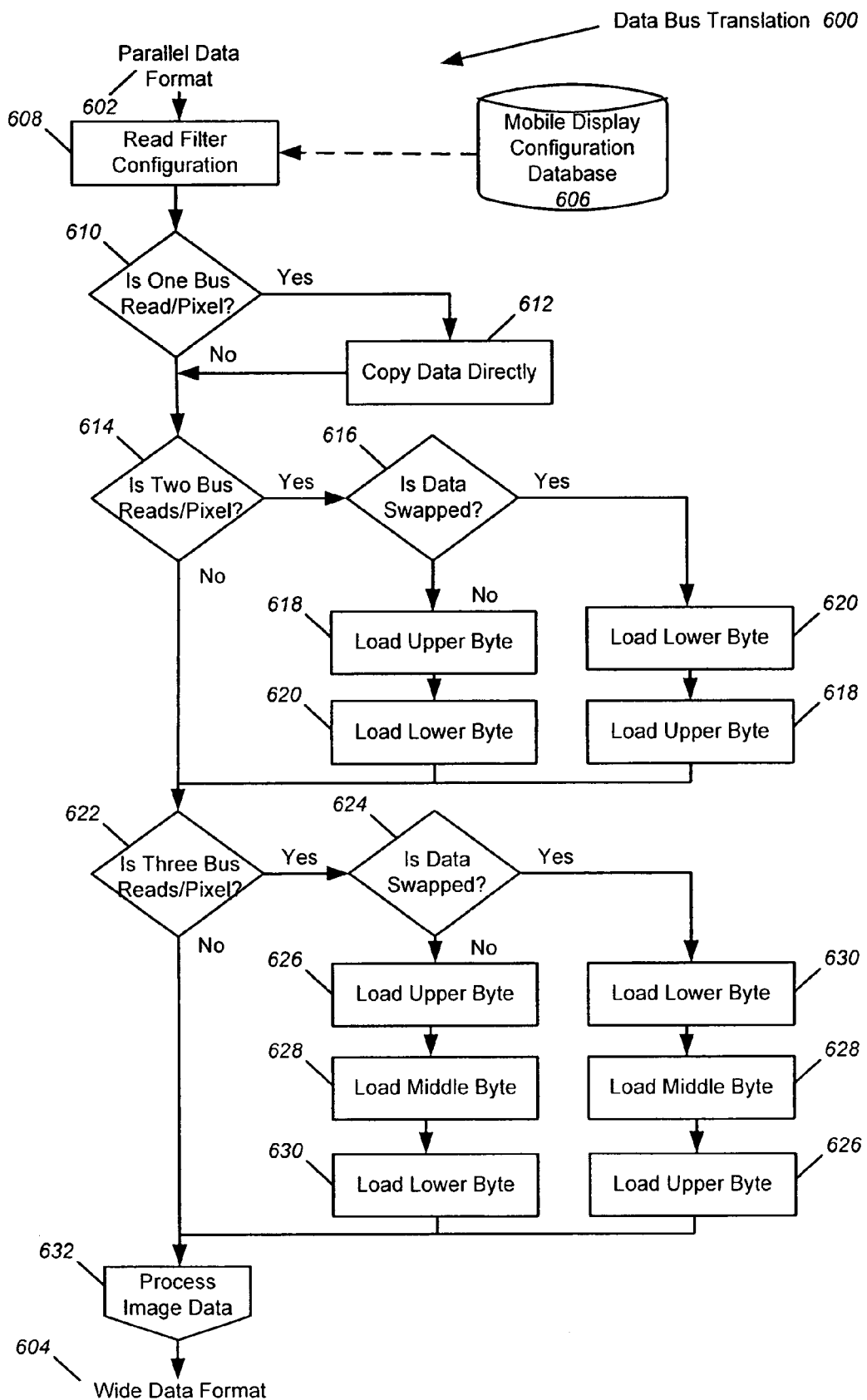
FIG. 6 is flow diagram of Data Bus Translation according to some embodiments of this invention.

FIG. 6 is flow diagram of Data Bus Translation 600 according to some embodiments of this invention. As described above, the Parallel Data Format 602 contains a single integer of data in each sample of the data stream. Multiple samples of data in Parallel Data Format 602 may need to be merged together into a Wide Data Format 604.

The Mobile Display Configuration Database 606 can contain information about the requirement for the Mobile Display information to be translated from Parallel format to Wide format. Some Mobile Displays already transfer the information in Wide format and do not need this conversion. The information may be retrieved directly from the Configuration Database each time data is processed, or may be stored as part of the local process to improve performance of the system (see block 608).

In step 610, a determination is made as to whether the information in the Parallel Data Format is already in Wide format, or needs to be converted. This decision is typically based on configuration data for this particular Mobile Display. If the data stream already contains one bus read (one sample) per visual pixel (one pixel in the final image) then this translation is not needed, and the data can be copied directly (see block 612). Step 612 will make a direct copy of the incoming stream of information to the outgoing stream of information. This occurs when the incoming stream is already in wide format and does not require a conversion.

In step 614, a determination is made as to whether the information in the Parallel Data Format contains two bus reads (samples) for each visual pixel (one pixel in the final image). This decision is typically based on configuration data for this particular Mobile Display. If this data does require two bus reads per pixel, then the data translation will be performed and multiple incoming samples of data will be read and merged into a single sample. In step 616, a determination is made as to whether the incoming information is in a standard order, with the most significant information appearing first, or in a "swapped" order, with the least significant information appearing first. This information order is also referred to as Little Endian and Big Endian formats. This decision is typically based on configuration data for this particular Mobile Display.

If the data is swapped, the least significant data will be loaded first, otherwise the most significant data will be loaded first. Step 618 will load the most significant byte of data into the sample. This may happen in several places in the operation flow, and all of these states perform the same operation. This may happen in several places in the operation flow, and all of these states perform the same operation. Step 620 will load the least significant byte of data into our sample. This may happen in several places in the operation flow, and all of these states perform the same operation.

If, at step 614, it is determined that the data does require two bus reads per pixel, then in step 622, a determination is made as to whether the information in the Parallel Data Format contains three bus reads (samples) for each visual pixel (one pixel in the final image). This decision is typically based on configuration data for this particular Mobile Display. If this data does require three bus reads per pixel, then the data translation will be performed. If not, processing will continue without performing this translation.

If the data does require three bus reads per pixel, multiple incoming samples of data will be read and merged into a single sample as part of this translation. In step 6624, a determination is made as to whether the incoming information is in a standard order, with the most significant information appearing first, or in a "swapped" order, with the least significant information appearing first. This information order is also referred to as Little Endian and Big Endian formats. This decision is typically based on configuration data for this particular Mobile Display.

If the data is swapped, the least significant data will be loaded first, otherwise the most significant data will be loaded first. Step 626 will load the most significant byte of data into the sample. This may happen in several places in the operation flow, and all of these states perform the same operation. Step 626 will load the next most significant byte of data into the sample. This may happen in several places in the operation flow, and all of these states perform the same operation. Step 630 will load the least significant byte of data into our sample. This may happen in several places in the operation flow, and all of these states perform the same operation.

At this point processing this stream of data can continue (see block 632) with the data in Wide format 604. The Wide Data Format 604 contains a single wide integer as each sample of data. This wide integer is typically 16, 18 or 24 bits wide, and contains a single pixel of visual, or a single integer of instruction information.

Referring again to FIG. 2, the Data/Instruction Controller step 216 can be used to make a decision if the current sample for the incoming data stream represents visual image information, or instruction information (image processing commands). Based on this decision, the information in the data stream will appear in the visual image, or will be interpreted as instruction information that is used for defining image coordinate boundaries and other image formatting.

Data/Instruction Controller

Figure 7:
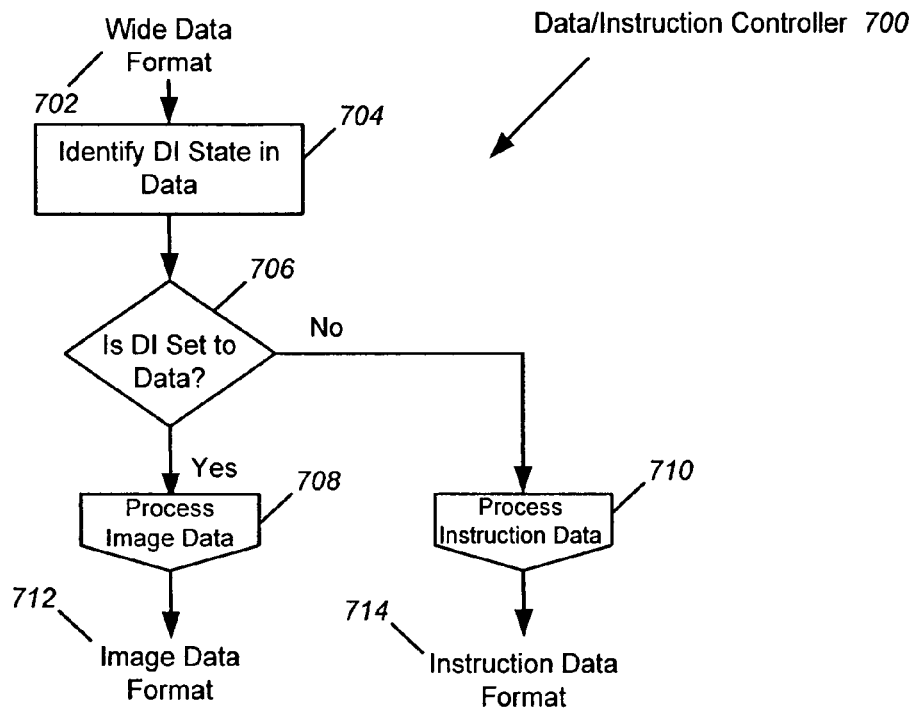
FIG. 7 is a flow diagram of a Data/Instruction Controller according to some embodiments of this invention.

FIG. 7 is a flow diagram of a Data/Instruction Controller 700 according to some embodiments of this invention. As mentioned above, the Wide Data Format 702 contains a single wide integer as each sample of data. This wide integer is typically 16, 18 or 24 bits wide, and contains a single pixel of visual data, or a single integer of instruction information. There is no data format translation done in this step and this, same data format is the input and output of the step, however the data format is re-named as it has been identified to be image or instruction data.

Step 704 identifies the Control Signal in the current data stream that represents the Data/Instruction (DI) control signal. The DI line is a binary electrical signal that can be represented by the value 0 or 1. Depending on the type of Mobile Display, a DI value of 0 may indicate instruction data, or a DI value of 1 may indicate instruction data. The Mobile Display Configuration Database will store the information for the specific Mobile Display that identifies the mapping of this data line. In this step, we will look at the current state of the Data/Instruction Control Signal, and determine if the signal is defined as Data or Instruction, based on our current configuration.

In step 706, a determination is made as to whether the DI Control Signal is set to Data. If the current state of the DI Control Signal is set to Data, it is determined that the current incoming data stream is visual image information, and should be processed as visual image data at step 708. The Image Data Format 712 contains a single integer as each sample of data. This integer is typically 16, 18 or 24 bits wide, and contains a single pixel of visual information.

If the Control Signal is not set to Data, then it will be assumed this is an instruction command, and processing of the information as image formatting commands will continue at step 710. The Instruction Data Format 714 contains a single integer as each sample of data. This integer is typically 16, 18 or 24 bits wide, and contains a single integer of instruction information (the instruction code).

Referring again to FIG. 2, the Instruction Identification step 218 may be used to extract the current information from the data stream and compare it to the known set of instructions for this Mobile Display. It is common for a Mobile Display to have many instructions which are not related to image processing and are therefore not important to the Unified Mobile Display Emulator. The Instruction Identification step can filter out any unnecessary commands or if the command is identified, it will continue processing the known instruction.

Instruction Identification

Figure 8:
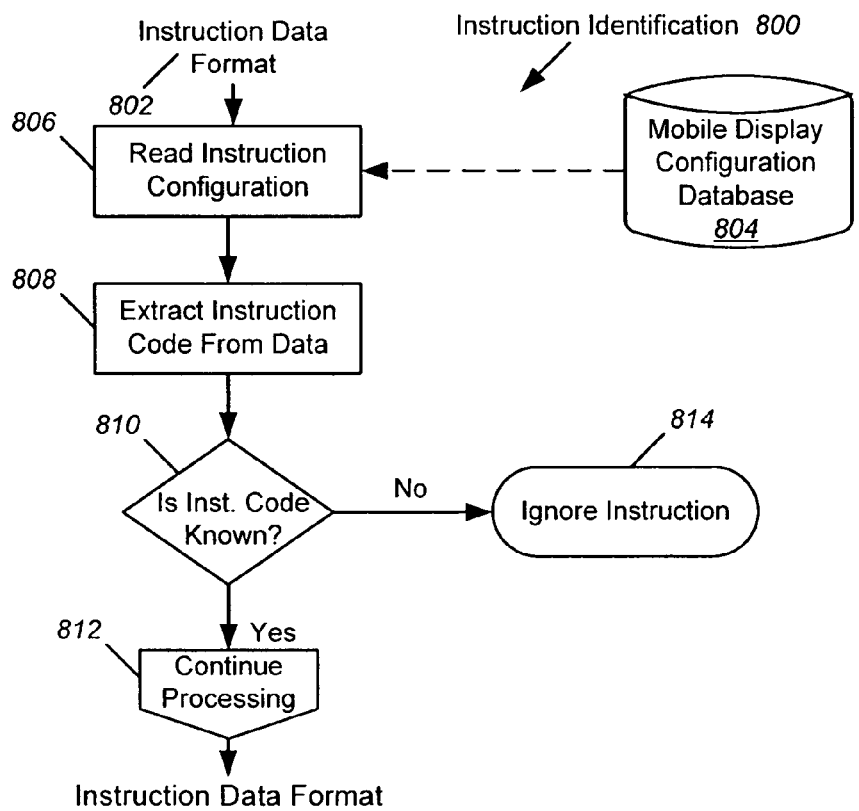
FIG. 8 is a flow diagram of Instruction Identification according to some embodiments of this invention.

FIG. 8 is a flow diagram of Instruction Identification 800 according to some embodiments of this invention. As described above, the Instruction Data Format 802 contains a single integer as each sample of data. This integer is typically 16, 18 or 24 bits wide, and contains a single integer of instruction information (the instruction code). There is no format translation in this step.

The Mobile Display Configuration Database 804 will contain information about the known instruction codes for the Mobile Display. Some Mobile Displays contain instructions which are not necessary for image processing, and these instruction codes will not be stored as part of the configuration, and will not be processed. Although there is no reason to process the non-visual instruction codes, these instructions could also be known, and processed, but would not have any visual effect on the display. The information may be retrieved directly from the Configuration Database 804 each time data is processed, or may be stored as part of the local process to improve performance of the system (see block 806).

Step 808 extracts the instruction code from the current data sample. Since the data is already formatted into a simple integer, there is generally no work to do here. In some cases, the instruction code must have some bits filtered, or shifted in order to be interpreted properly.

In step 810, a comparison of the list of known instruction codes to the code currently being processed is made to determine if the current code is among the list of known instructions. If the code is known, then the instruction is used for image processing, and we will continue to interpret the instruction parameters in order to configure the current image processing (see block 812). If the instruction is not known, then the instruction is assumed to be unnecessary for image formatting and will be ignored (see block 814).

Referring again to FIG. 2, the Instruction Processor step 220 is responsible for extracting a particular instruction from the stream of information and storing that information for use by the Image Processor. In general, the instruction data does not cause any action to happen immediately, but simply stores coordinate boundary parameters that will be used as the next stream of visual information is processed by the Unified Mobile Display Emulator. Although the typical configuration uses only the small set of image processing commands shown in the flow diagram, there are some exceptions to this. In these exceptional configurations, additional commands may be added to the Instruction Processor as necessary.

Instruction Processor

Figure 9:
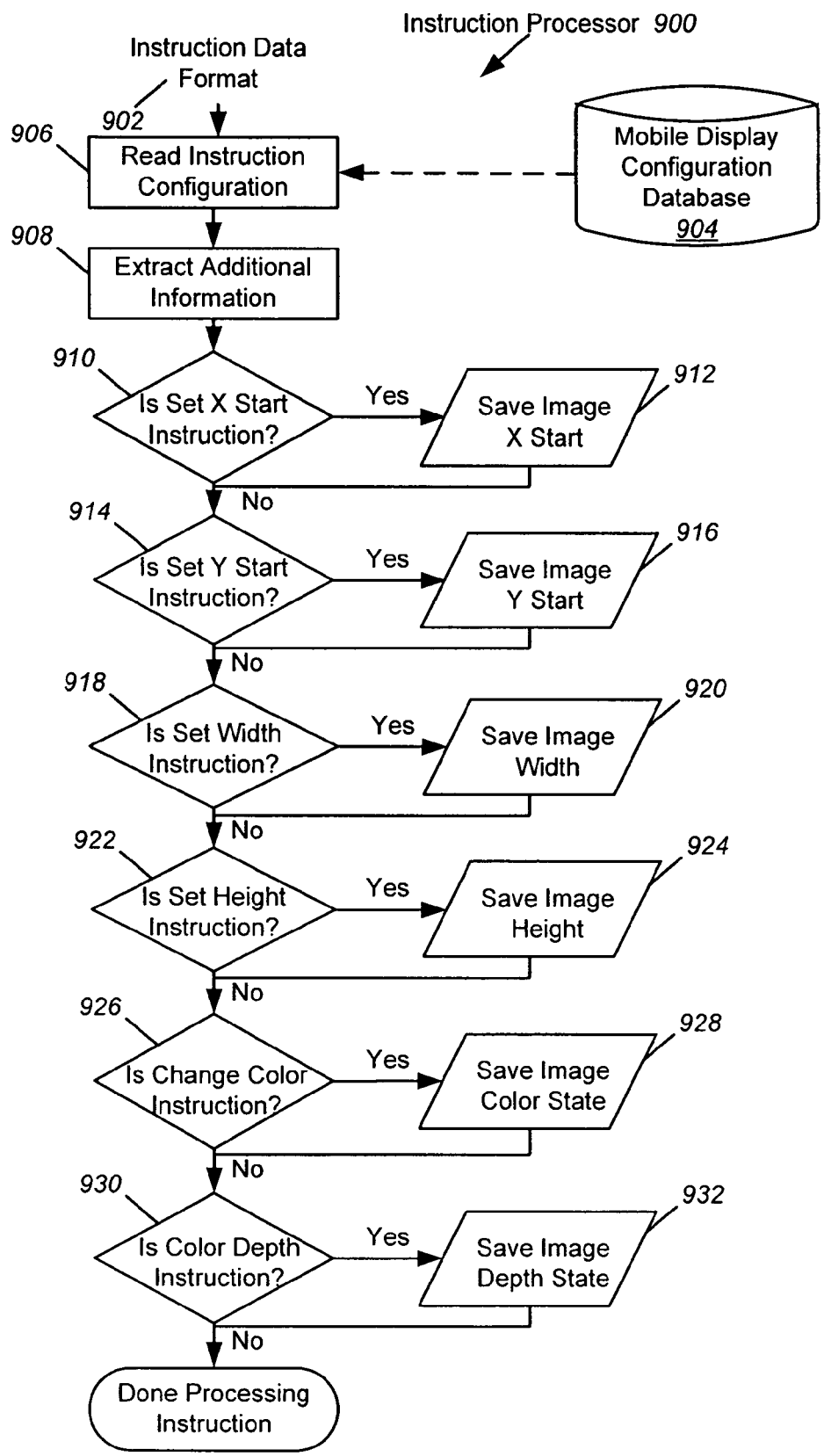
FIG. 9 is a flow diagram of an Instruction Processor according to some embodiments of this invention.

FIG. 9 is a flow diagram of an Instruction Processor 900 according to some embodiments of this invention. As mentioned above, the Instruction Data Format 902 contains a single integer as each sample of data. This integer is typically 16, 18 or 24 bits wide, and contains a single integer of instruction information (the instruction code). There is no format translation in this step.

The Mobile Display Configuration Database 904 can contain information about the known instruction codes for the Mobile Display, and information about how to extract additional information (such as coordinate data) for this instruction on this Mobile Display.

There are several different formats that are typically used for the same type of instruction data. For example, an instruction that sets the X Start and Y Start location coordinate boundary on the Mobile Display may be sent as one command, or may be sent as two separate commands. These format differences depend on the type of Mobile Display being processed. These minor variances in commands structure are generally not important to the Instruction Processor and differences in formatting are stored as part of the configuration database information. The information may be retrieved directly from the Configuration Database each time data is processed, or may be stored as part of the local process to improve performance of the system (see block 906).

Step 908 extracts any additional information associated with this command. This may take additional samples from the incoming data stream in order to extract the information. The additional information may change slightly depending on the format of the instruction, but generally this is one to four integers of data that represent visual coordinate boundaries for the associated command. For example, the command Set X Start will be followed by an integer which contains the X coordinate to start displaying the visual information.

Step 910 determines if the current instruction contains information that can be used to set the starting X coordinate to be used by the Image Processor when the next set of image data is available in the data stream. If this information is found, the current coordinate information will be saved (see step 912) for use by the Image Processor when the next set of image data is available in the data stream.

Step 914 determines if the current instruction contains information that can be used to set the starting Y coordinate to be used by the Image Processor when the next set of image data is available in the data stream. If this information is found, the current coordinate information will be saved (see step 916) for use by the Image Processor when the next set of image data is available in the data stream.

Step 918 determines if the current instruction contains information that can be used to set the Width coordinate to be used by the Image Processor when the next set of image data is available in the data stream. If this information is found, the current coordinate information will be saved (see step 920) for use by the Image Processor when the next set of image data is available in the data stream.

Step 922 determines if the current instruction contains information that can be used to set the Height coordinate to be used by the Image Processor when the next set of image data is available in the data stream. If this information is found, the current coordinate information will be saved (see step 924) for use by the Image Processor when the next set of image data is available in the data stream.

Step 926 determines if the current instruction contains information that can be used to change the color mode to be used by the Image Processor when the next set of image data is available in the data stream. The color mode determines if the image data is in RGB (red, green, blue) format, or if the image data is in YUV (luminance, chrominance) format. These formats can be easily converted to the other, but video information such as on a typical television is generally transferred in YUV format and computer graphics information is generally transferred in RGB format. If this information is found, the current color state information will be saved (see step 928) for use by the Image Processor when the next set of image data is available in the data stream.

Step 930 determines if the current instruction contains information that can be used to set the current color depth format to be used by the Image Processor when the next set of image data is available in the data stream. The color depth format determines the number of bits that are used for each channel for red, green, and blue information. There are several common formats, but in general each color channel may be represented by between 4 and 8 bits of information. If this information is found, the current color depth information will be saved (see step 932) for use by the Image Processor when the next set of image data is available in the data stream.

Referring again to FIG. 2, The Image Data Processor 222 can be responsible for placing the incoming stream of Image Data at the correct coordinate location in the Image Memory Format buffer being used for the Mobile Display. The Image Memory Format is a dynamically addressable space which contains all of the visual image information intended to appear on the Mobile Display in a rectangular format addressed by a standard X, Y coordinate system. As visual image data is being processed by the Image Data Processor, the data is being placed within the coordinate boundaries in the Image Memory Format buffer that were specified by the commands interpreted by the Instruction Processor.

Image Data Processor

Figure 10:
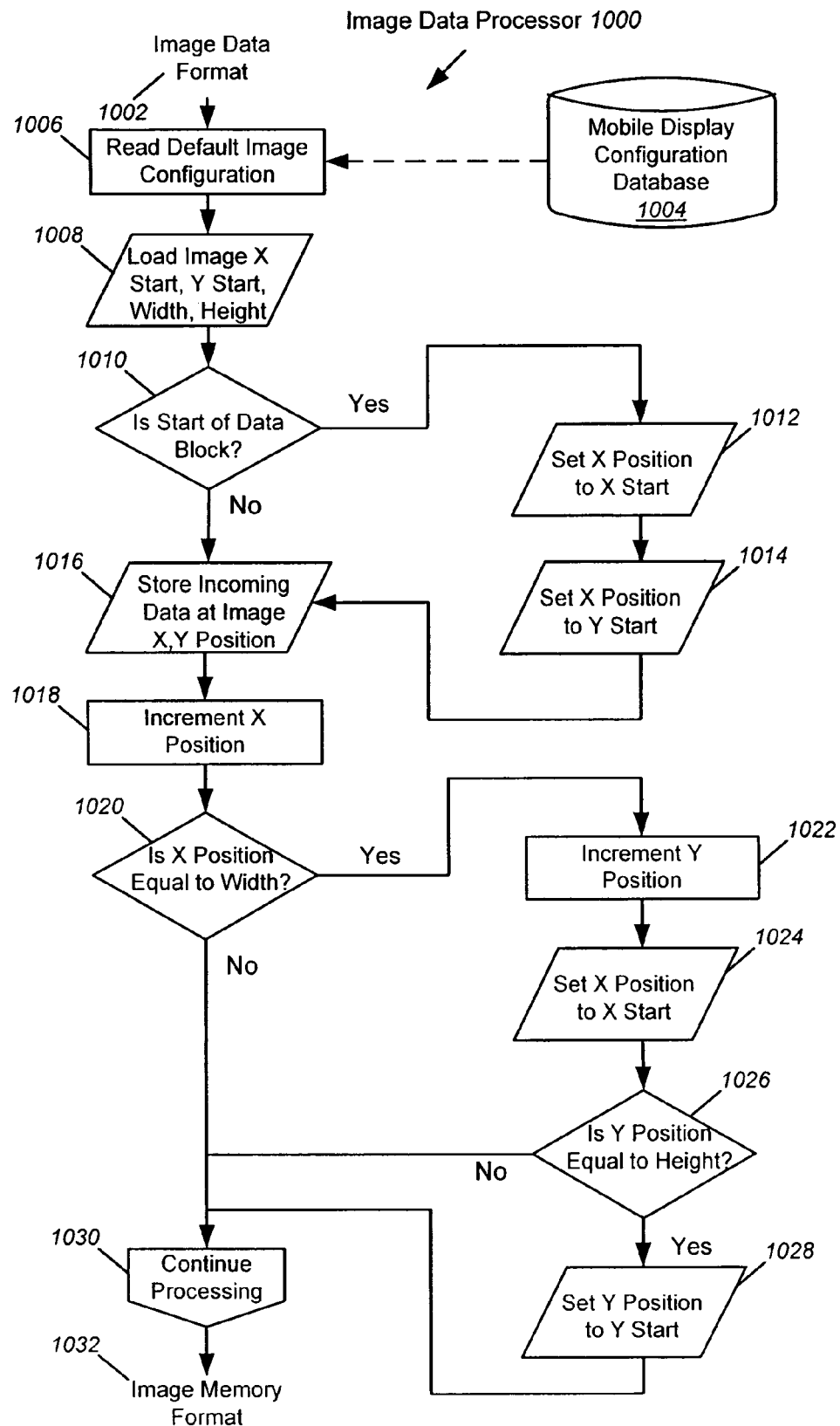
FIG. 10 is a flow diagram of an Image Data Processor according to some embodiments of this invention.

FIG. 10 is a flow diagram of an Image Data Processor 1000 according to some embodiments of this invention. As mentioned above, the Image Data Format 1002 contains a single integer as each sample of data. This integer is typically 16, 18 or 24 bits wide, and contains a single pixel of visual information.

The Mobile Display Configuration Database 1004 can contain information about the default coordinate settings for the Mobile Display. For example, the width and height of the display is known ahead of time and saved with the configuration data. Generally, this configuration data will be overridden by the commands interpreted by the instruction processor. The information may be retrieved directly from the Configuration Database each time data is processed, or may be stored as part of the local process to improve performance of the system (see block 1006).

Step 1008 loads the coordinate boundaries saved by the Instruction Processor.

Step 1010 determines if the first sample of image data at the start of an image data block is being processed. The start of an image data block is typically defined as the first image data directly after a set of instructions, although there are some instructions that do not signal the start of a new data block.

If this sample is determined to be the start of an image data block, then the active X and Y coordinate positions will be reset to the saved X and Y Start positions. Step 1012 resets the currently active X coordinate position to the saved X Start position. This state may also occur at the end of a line of image data. Step 1014 resets the currently active Y coordinate position to the saved Y Start position. This state may also occur at the end of a full page of image data.

Step 1016 stores the image data being processed at the current X, Y position within the stored Video Memory. This X, Y position represents the position the single pixel of image data would appear on the Mobile Display if it were being viewed directly. Step 1018 then automatically increments the storage location for the image data to the next X position in the Video Memory space. If this is the end of a line, the position will be reset to the start of the line.

Step 1020 determines if the current X position has reached the coordinate boundary specified by the image Width. If it has reached the boundary, it will be reset to the start, otherwise, processing will continue at the current X position. Step 1022 automatically increments the storage location for the image data to the next Y position in the Video Memory space. If this is the end of the page, the position will be reset to the start of the page (see step 1024). Step 1026 determines if the current Y position has reached the coordinate boundary specified by the image Height. If it has reached the boundary, it will be reset to the start of the page (see step 1028), otherwise, processing will continue at the current Y position.

At step 1030, processing the image information can continue since it has been stored in the Image Memory Format 1032. The Image Memory Format 1032 is a dynamically addressable space which contains all of the visual image information intended to appear on the Mobile Display in a rectangular format addressed by a standard X, Y coordinate system.

Referring again to FIG. 2, the Color Space Translation step 224 can be responsible for converting the Image Memory Format data into a more standard RGB (red, green, blue) Format if it is not already in this format. The current color space state determines if the incoming image data is in RGB (red, green, blue) format, or if the image data is in YUV (luminance, chrominance) format. These formats can be easily converted from one to the other, but video information such as would appear on a typical television is generally transferred in YUV format and computer graphics information is generally transferred in RGB format.

In the most common configuration of the Unified Mobile Display Emulator, the Unified Image Format is specified in the RGB color space. Since RGB, and YUV format can be directly converted, it is not important that the final color space is RGB and could just as easily be another standard color space such as YUV, or a proprietary color space format that is directly convertible to RGB or YUV.

Color Space Translation

Figure 11:
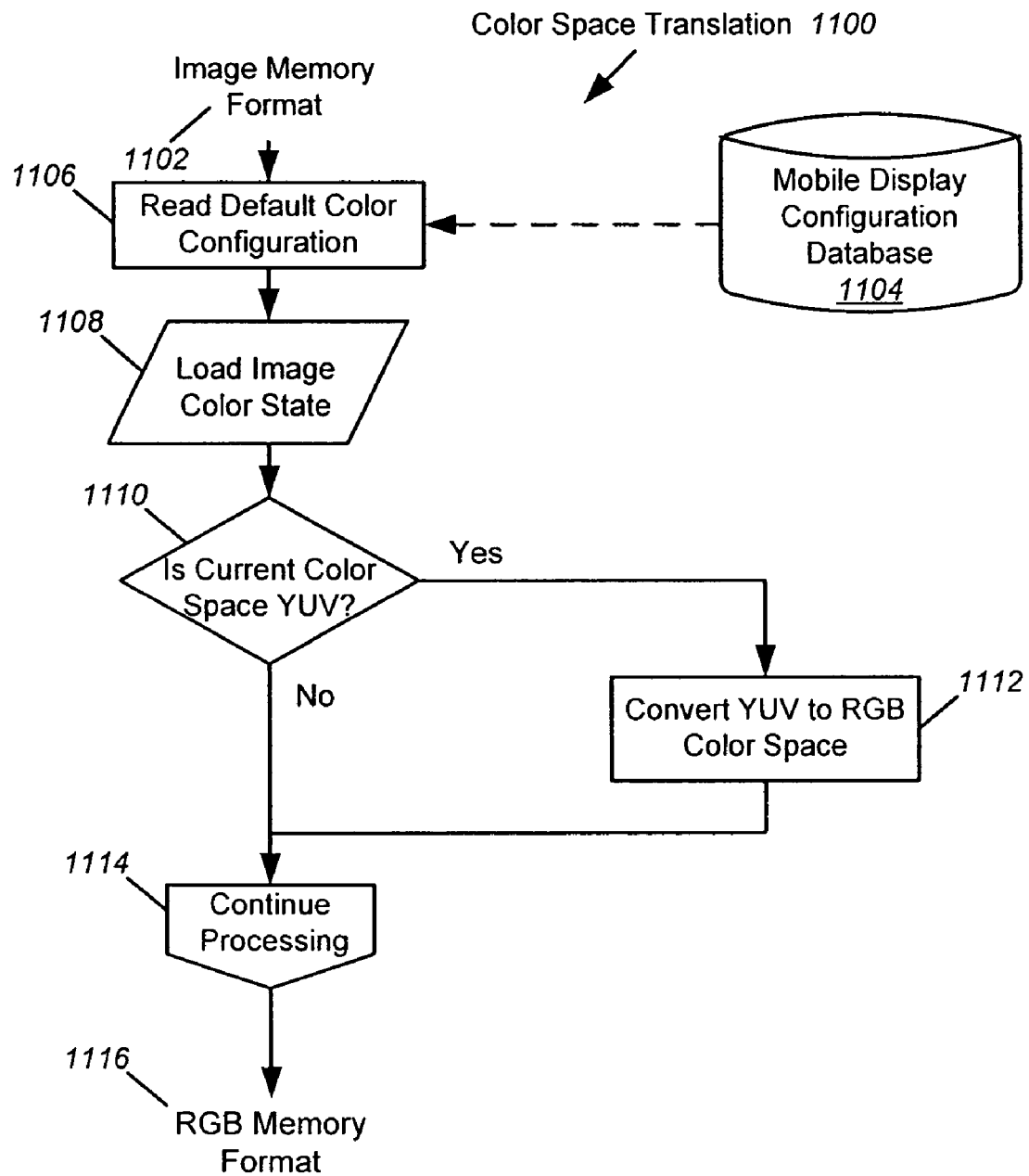
FIG. 11 is a flow diagram of Color Space Translation according to some embodiments of this invention.

FIG. 11 is a flow diagram of Color Space Translation 1100 according to some embodiments of this invention. The Image Memory Format 1102 is a dynamically addressable space which contains all of the visual image information intended to appear on the Mobile Display in a rectangular format addressed by a standard X, Y coordinate system.

The Mobile Display Configuration Database 1104 will contain information about the default color space configuration for the Mobile Display. The most common configuration for a Mobile Display is to operate in only a single color space configuration which is stored in the configuration database. The information may be retrieved directly from the Configuration Database each time data is processed, or may be stored as part of the local process to improve performance of the system (see step 1106).

Step 1108 loads the current color space state saved by the Instruction Processor.

Step 1110 determines if the currently configured color space is in YUV format. If it is in this format than the incoming visual information will be converted to the RGB color space. If the current image data is already in RGB format, then no conversion is performed and the RGB Memory Format is identical to the Video Memory Format. If the current image data is not already in RGB format, step 1112 converts each YUV image sample to the corresponding RGB image sample. This conversion is done with a standard conversion formula as follows.

$$R = Y + 1.139837398373983740 * V$$

$$G = Y - 0.3946517043589703515 * U - 0.5805986066674976801 * V$$

$$B = Y + 2.032110091743119266 * U$$

Although the values in this formula provide an accurate conversion between YUV and RGB color space, other coefficients that differ slightly from these values could also be used and would also provide an adequate conversion.

Processing the image data then continues at step 1114. The RGB Memory Format 1116 is a dynamically addressable space which contains all of the visual image information in RGB color space that is intended to appear on the Mobile Display in a rectangular format addressed by a standard X, Y coordinate system.

Referring again to FIG. 2, the Color Depth Translation step 226 is responsible for converting the RGB Memory Format data into a standard 8 bit per pixel color depth. The color depth of an RGB pixel defines the number of bits that are used for each Red, Green and Blue color channel in the pixel.

There are several common combinations of color depth used in Mobile Displays, but the most common configurations contain between 4 and 8 bits of information for each color channel in an image pixel.

Any color depth that contains less than 8 bits per pixel of information for a color channel can be extended, or rounded to fill the larger color space. Although several approaches can be taken to extend the color data to add the additional color depth, the specific approach is generally unimportant. Any color depth extension will create an approximation of the color in the extend, depth, and the differences between various methods of approximations of the extended color are largely imperceptible, and would be viewed as conveying the same visual information.

Color Depth Translation

Figure 12:
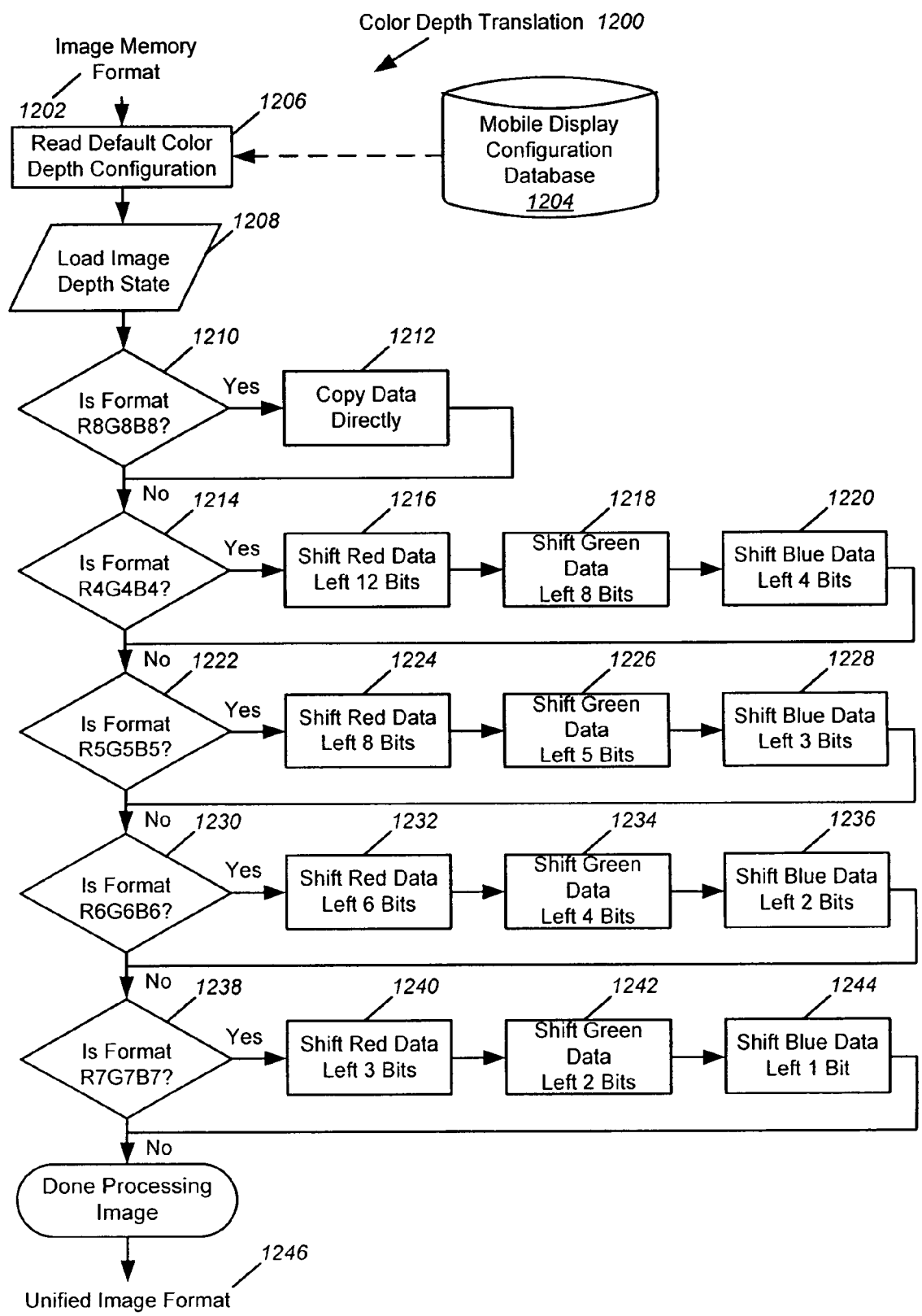
FIG. 12 is a flow diagram of Color Depth Translation according to some embodiments of this invention.

FIG. 12 is a flow diagram of Color Depth Translation 1200 according to some embodiments of this invention. The RGB Memory Format 1202 is a dynamically addressable space which contains all of the visual image information in RGB color space that is intended to appear on the Mobile Display in a rectangular format addressed by a standard X, Y coordinate system.

The Mobile Display Configuration Database 1204 can contain information about the default color depth configuration for the Mobile Display. The most common configuration for a Mobile Display is to operate in only a single color depth configuration which is stored in the configuration database. The information may be retrieved directly from the Configuration Database each time data is processed, or may be stored as part of the local process to improve performance of the system (see block 1206).

Step 1208 loads the current color depth state saved by the Instruction Processor.

Step 1210 determines if the current RGB format contains 8 bits of red, 8 bits of green, and 8 bits of blue. If the current RGB format is R8G8B8 then no conversion will be necessary and the RGB data can be copied directly to the final image format (see block 1212).

Step 1214 determines if the current RGB format contains 4 bits of red, 4 bits of green, and 4 bits of blue. If the current RGB format is R4G4B4, it will be converted to a more standard 8 bit per pixel RGB format. If the current RGB format is R4G4B4, step 1216 shifts the Red color channel of data left by 12 bits into the correct position for a 24 bit RGB format, step 1218 shifts the Green color channel of data left by 8 bits into the correct position for a 24 bit RGB format, and step 1220 shifts the Blue color channel of data left by 4 bits into the correct position for a 24 bit RGB format.

Step 1222 determines if the current RGB format contains 5 bits of red, 6 bits of green, and 5 bits of blue. If the current RGB format is R5G6B5, it will be converted to a more standard 8 bit per pixel RGB format. If the current RGB format is R5G6B5, step 1224 shifts the Red color channel of data left by 8 bits into the correct position for a 24 bit RGB format, step 1226 will shift the Green color channel of data left by 5 bits into the correct position for a 24 bit RGB format, and step 1228 will shift the Blue color channel of data left by 3 bits into the correct position for a 24 bit RGB format.

Step 1230 determines if the current RGB format contains 6 bits of red, 6 bits of green, and 6 bits of blue. If the current RGB format is R6G6B6, it will be converted to a more standard 8 bit per pixel RGB format. If the current RGB format is R6G6B6, step 1232 shifts the Red color channel of data left by 6 bits into the correct position for a 24 bit RGB format, step 1234 shifts the Green color channel of data left by 4 bits into the correct position for a 24 bit RGB format, and step 1236 shifts the Blue color channel of data left by 2 bits into the correct position for a 24 bit RGB format.

Step 1238 determines if the current RGB format contains 7 bits of red, 7 bits of green, and 7 bits of blue. If the current RGB format is R7G7B7, it will be converted to a more standard 8 bit per pixel RGB format. If the current RGB format is R7G7B7, step 1240 shifts the Red color channel of data left by 3 bits into the correct position for a 24 bit RGB format, step 1242 shifts the Red color channel of data left by 2 bits into the correct position for a 24 bit RGB format, and step 1244 shifts the Red color channel of data left by 1 bits into the correct position for a 24 bit RGB format.

At this step the processing of the image data is complete and the image is now in a Unified Image Format 1246. The Unified Image Format 1246 is a simple visual image format that can be easily used by manual or automated test systems. This image format can be produced from a stream of visual information coming from a Mobile Device and unifies the wide variety of visual, instruction, and transport formats used by Mobile Displays. In some embodiments of this invention, the Unified Image Format is a simple 24 bit uncompressed RGB format, but any standard image or video format such as JPEG, GIF, or MPEG, could also be used. Custom designed proprietary formats could also be used for the Unified Image Format.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for converting mobile display information into a unified image format for testing of mobile content, comprising:
   receiving data from communications between a mobile operating system and a mobile display;
   identifying a type of mobile display;
   determining if the data represents visual image information or instruction information;
   if the data represents instruction information, identifying and extracting the instruction information from the data; and
   if the data represents visual image information,
      placing the visual image information at a correct coordinate location in an image memory format buffer,
      converting the visual image information into a particular color format, and
      converting the visual image information into a particular color depth.

2. The method of claim 1, further comprising filtering out any information in the data that is not relevant to displaying a mobile device image.

3. The method of claim 1, further comprising re-ordering the data so that it matches a standard integer value format used by general purpose computers.

4. The method of claim 1, further comprising converting the data to parallel data if the data is serial data.

5. A computer-readable medium comprising program code for converting mobile display information into a unified image format for testing of mobile content, the program code for causing performance of a method comprising:
   receiving data from communications between a mobile operating system and a mobile display;
   identifying a type of mobile display;
   determining if the data represents visual image information or instruction information;
   if the data represents instruction information, identifying and extracting the instruction information from the data; and
   if the data represents visual image information,
      placing the visual image information at a correct coordinate location in an image memory format buffer,
      converting the visual image information into a particular color format, and
      converting the visual image information into a particular color depth.

6. The computer-readable medium of claim 5, the method further comprising filtering out any information in the data that is not relevant to displaying a mobile device image.

7. The computer-readable medium of claim 5, the method further comprising re-ordering the data so that it matches a standard integer value format used by general purpose computers.

8. The computer-readable medium of claim 5, the method further comprising converting the data to parallel data if the data is serial data.

9. A system for converting mobile display information into a unified image format for testing of mobile content, comprising:
   means for receiving data from communications between a mobile operating system and a mobile display;
   means for identifying a type of mobile display;
   means for determining if the data represents visual image information or instruction information;
   means for, if the data represents instruction information, identifying and extracting the instruction information from the data; and
   means for, if the data represents visual image information,
      placing the visual image information at a correct coordinate location in an image memory format buffer,
      converting the visual image information into a particular color format, and
      converting the visual image information into a particular color depth.

10. The system of claim 9, further comprising means for filtering out any information in the data that is not relevant to displaying a mobile device image.

11. The system of claim 9, further comprising means for re-ordering the data so that it matches a standard integer value format used by general purpose computers.

12. The system of claim 9, further comprising means for converting the data to parallel data if the data is serial data.

* * * * *